(12) United States Patent
Stewart (10) Patent No.: US 8,854,188 B2
(45) Date of Patent: Oct. 7, 2014

(54) SIGNAL CANCELLING TRANSMIT/RECEIVE MULTI-LOOP ANTENNA FOR A RADIO FREQUENCY IDENTIFICATION READER

(75) Inventor: Robert Stewart, Boulder, CO (US)

(73) Assignee: Allflex USA, Inc., DFW Airport, TX (US)

( * ) Notice: Subject to any disclaimer, the term of this patent is extended or adjusted under 35 U.S.C. 154(b) by 492 days.

(21) Appl. No.: 12/939,099

(22) Filed: Nov. 3, 2010

(65) Prior Publication Data

US 2011/0210824 A1    Sep. 1, 2011

Related U.S. Application Data

(60) Provisional application No. 61/257,906, filed on Nov. 4, 2009.

(51) Int. Cl.
| | |
|---|---|
| *H04Q 5/22* | (2006.01) |
| *H04B 5/00* | (2006.01) |
| *G06K 7/10* | (2006.01) |
| *H01Q 1/00* | (2006.01) |
| *H01Q 1/22* | (2006.01) |
| *G06K 7/00* | (2006.01) |

(52) U.S. Cl.
CPC .............. *H01Q 1/00* (2013.01); *G06K 7/10346* (2013.01); *H01Q 1/2216* (2013.01); *G06K 7/0008* (2013.01)
USPC ......................................... 340/10.1; 455/41.1

(58) Field of Classification Search
CPC ... H01Q 1/2216; H01Q 7/00; C12N 2310/322
USPC .............. 340/10.1, 572.1, 276; 455/41.1, 73; 375/316; 370/286
See application file for complete search history.

(56) References Cited

U.S. PATENT DOCUMENTS

| | | | |
|---|---|---|---|
| 2,350,337 | A | 6/1944 | Brunner |
| 3,713,146 | A | 1/1973 | Carroll et al. |

(Continued)

FOREIGN PATENT DOCUMENTS

| | | |
|---|---|---|
| WO | 2011044585 A1 | 4/2011 |
| WO | 2011056891 A1 | 5/2011 |

OTHER PUBLICATIONS

Barnhardt et al, "Trainer-Mounted RFID Reader Scans EID Tags During Cattle Shipments", Kansas State University Report of Progress 978, Beef Cattle Research, 2007, Title page, pp. 22-24.

(Continued)

*Primary Examiner* — Benjamin C Lee
*Assistant Examiner* — Sigmund Tang
(74) *Attorney, Agent, or Firm* — KPPB LLP (57) ABSTRACT

In an inductively coupled radio frequency identification (RFID) system deployed in animal and livestock applications, reading system efficacy can be compromised by animal movement on, around, or near metal structures prone to producing sonic frequencies. Such is the case, for example, when a walk-by antenna is mounted at the entry door of a livestock transport trader, and animals transit on a metallic ramp and metallic trader floor. Associated with the observable acoustic noise are subtle disturbances in the magnetic field surrounding the antenna due to vibrating metal altering the reluctance of the antenna's magnetic field. This acoustic noise manifests itself as an electrical noise phenomenon that interferes with the signals of certain types of identification tags which rely on amplitude modulation. The detrimental effects of acoustic noise from metal structures can be mitigated by using a multi-loop antenna that limits the spatial distribution of the transmitted magnetic field and cancels close by magnetic field disturbances.

30 Claims, 6 Drawing Sheets

(56) References Cited

U.S. PATENT DOCUMENTS

| | | | |
|---|---|---|---|
| 4,251,808 A | 2/1981 | Lichtblau | |
| 4,551,712 A | 11/1985 | Fockens | |
| 4,751,516 A * | 6/1988 | Lichtblau | 343/742 |
| 4,776,040 A | 10/1988 | Ichikawa et al. | |
| 4,795,995 A | 1/1989 | Eccleston et al. | |
| 4,999,641 A | 3/1991 | Cordery et al. | |
| 5,103,235 A | 4/1992 | Clemens | |
| 5,168,282 A | 12/1992 | Viereck | |
| 5,289,199 A | 2/1994 | Viereck | |
| 5,289,500 A | 2/1994 | Inou et al. | |
| 5,451,958 A | 9/1995 | Schuermann | |
| 5,649,295 A | 7/1997 | Shober et al. | |
| 5,914,692 A | 6/1999 | Bowers et al. | |
| 5,952,935 A | 9/1999 | Mejia et al. | |
| 5,963,173 A | 10/1999 | Lian et al. | |
| D416,883 S | 11/1999 | Wagner et al. | |
| 6,137,447 A | 10/2000 | Saitoh et al. | |
| 6,353,406 B1 | 3/2002 | Lanzl et al. | |
| 6,434,194 B1 | 8/2002 | Eisenberg et al. | |
| 6,913,201 B1 | 7/2005 | Wagner et al. | |
| 7,028,638 B2 | 4/2006 | Bonsall | |
| 7,197,279 B2 | 3/2007 | Bellantoni | |
| 7,299,029 B2 | 11/2007 | Elder et al. | |
| 7,307,529 B2 | 12/2007 | Gutnik et al. | |
| 7,323,977 B2 | 1/2008 | Kodukula et al. | |
| 7,353,997 B2 | 4/2008 | Tikhov et al. | |
| 7,528,725 B2 | 5/2009 | Stewart | |
| 7,738,408 B2 * | 6/2010 | Chiu et al. | 370/276 |
| 7,864,718 B2 * | 1/2011 | Huang et al. | 370/286 |
| 7,928,847 B2 * | 4/2011 | Murdoch et al. | 340/572.7 |
| 7,936,272 B2 | 5/2011 | Stewart | |
| 8,493,185 B2 * | 7/2013 | Bateman | 340/10.1 |
| 8,723,509 B2 * | 5/2014 | Patterson et al. | 324/207.15 |
| 2003/0132846 A1 * | 7/2003 | Hilliard | 340/573.2 |
| 2004/0134991 A1 | 7/2004 | Fletcher et al. | |
| 2004/0192223 A1 | 9/2004 | Gardenfors et al. | |
| 2005/0084003 A1 * | 4/2005 | Duron et al. | 375/221 |
| 2005/0162276 A1 * | 7/2005 | Balch et al. | 340/572.7 |
| 2006/0261928 A1 | 11/2006 | Solberg et al. | |
| 2006/0279406 A1 | 12/2006 | Stewart et al. | |
| 2007/0013483 A1 | 1/2007 | Stewart | |
| 2007/0046369 A1 | 3/2007 | Schober et al. | |
| 2007/0057797 A1 | 3/2007 | Waldner et al. | |
| 2007/0096875 A1 | 5/2007 | Waterhouse et al. | |
| 2007/0207732 A1 * | 9/2007 | Rofougaran et al. | 455/41.1 |
| 2008/0012712 A1 | 1/2008 | Shimizu | |
| 2008/0150689 A1 | 6/2008 | Chiu et al. | |
| 2008/0218314 A1 | 9/2008 | Van Eeden | |
| 2008/0280581 A1 | 11/2008 | Rofougaran et al. | |
| 2009/0130981 A1 * | 5/2009 | Nagai et al. | 455/63.1 |
| 2009/0207027 A1 | 8/2009 | Banerjee et al. | |
| 2011/0205026 A1 | 8/2011 | Bateman | |
| 2011/0210823 A1 | 9/2011 | Bateman | |

OTHER PUBLICATIONS

"Investigating the Effect of Acoustic/Mechanical Interference on Radio Frequency Identity (RFID) Systems Using to Identify Animals Electronically", May 2007-Jul. 2007, Tender Reference: CR/2007/01, 13 pgs.

International Search Report for International Application PCT/US2010/055326; Report completed Dec. 21, 2010; 2 pgs.

Written Opinion for International Application PCT/US2010/055326; Report completed Dec. 21, 2010; 7 pgs.

International Search Report and Written Opinion for International Application No. PCT/US2009/056110, date completed Oct. 21, 2009, 11 pgs.

* cited by examiner

SIGNAL CANCELLING TRANSMIT/RECEIVE MULTI-LOOP ANTENNA FOR A RADIO FREQUENCY IDENTIFICATION READER

CROSS-REFERENCE TO RELATED APPLICATIONS

The current application claims priority to U.S. Provisional Application No. 61/257,906, filed Nov. 4, 2009, the disclosure of which is incorporated herein by reference.

FIELD OF THE INVENTION

This invention relates to radio frequency identification (RFID) systems that use low frequency inductively coupled signals, and in particular, to noise cancelling antenna systems for use in RFID systems.

BACKGROUND OF THE INVENTION

Passive low frequency RFID readers and tags use operating principles that are well-known to those of ordinary skill in the art, and that are described in extensive detail in several seminal inventions, including U.S. Pat. No. 1,744,036 to Brard (1930), U.S. Pat. No. 3,299,424 to Vinding (1967), U.S. Pat. No. 3,713,146 to Cardullo (1973), and U.S. Pat. No. 5,053,774 to Schuermann (1991), and in textbooks such as "RFID Handbook" (Finkenzeller—1999).

Figure 1A:
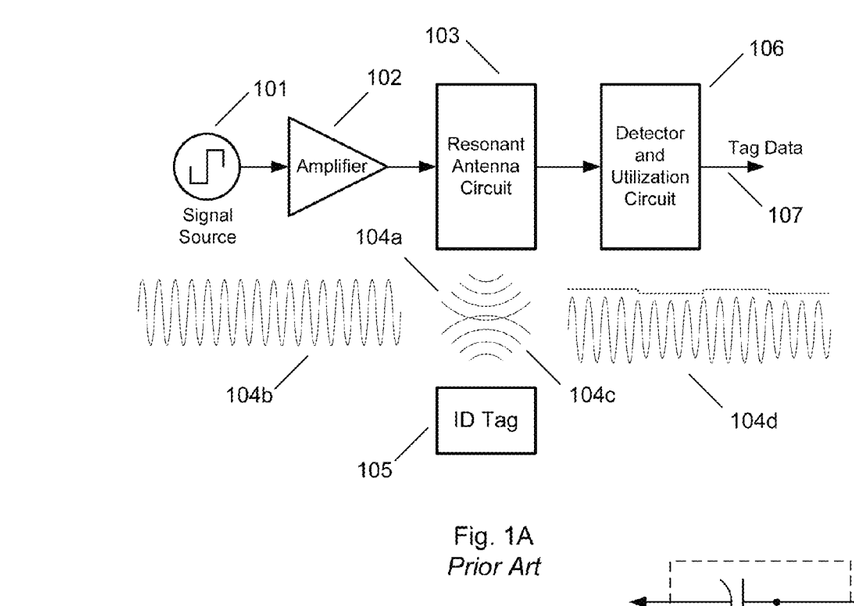
FIG. 1A illustrates the basic components of a prior art passive RFID system.

In an inductively coupled RFID system, as depicted in FIG. 1A, the reader includes electronic circuitry, which generates an activation signal (usually a single frequency unmodulated signal) using a signal source [101] and an amplifier [102] to drive a resonant antenna circuit [103]. This activation signal is manifested as a time-varying electromagnetic field [104b], which couples with the ID tag [105] by means of the electromagnetic field's magnetic field component [104a], [104c]. The ID tag [105] converts this magnetic field into an electrical voltage and current, and uses this electrical power to activate its internal electronic circuitry. Using any of several possible modulation schemes, such as amplitude modulation [104d], the ID tag conveys binary encoded information stored within it back to the reader via the magnetic field [104a], [104c] where the detector and utilization circuit [106] converts this binary code into an alphanumeric format tag data [107] in accordance with some prescribed application.

Figure 1B:
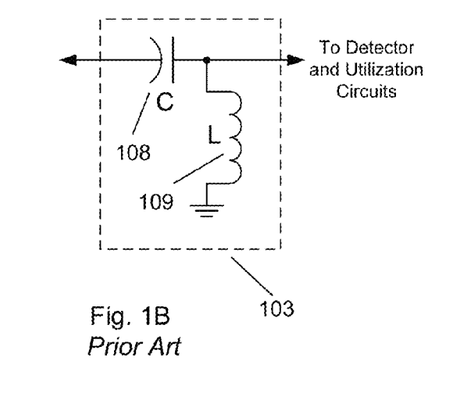
FIG. 1B illustrates a prior art resonant antenna circuit for a single antenna coil reader.
Figure 1C:
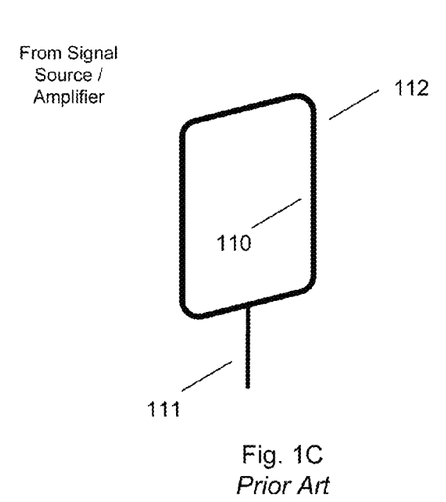
FIG. 1C illustrates figuratively a prior art single loop antenna.

Typically in RFID systems, the resonant antenna circuit [103] includes the circuit elements shown in FIG. 1B and includes a capacitor [108] and an inductor [109], the inductor existing in a physical form such that it produces a spatially distributed magnetic field, and the values of the capacitor and inductor selected so as to resonate at the signal source frequency [101]. Such an inductor commonly is shaped in the form of a closed loop [112] as shown in FIG. 1C, having one or more concentric turns of a conductor [110] and two connecting terminals [111] through which the driving signal is applied.

ISO Standard 11785

International Standards Organization (ISO) Standard 11785, "*Radio frequency identification of animals—Technical Concept*" (1996) (ISO 11785) defines the technical principles for communications between RFID readers and two types of electronic passive identification transponders. The two types of ID tag technologies defined in ISO 11785 are are designated "full-duplex" ("FDX-B") and "half-duplex" ("HDX"). Both types of ISO tags, which can also be referred to as ISO transponders, contain identification information stored in binary form that can be conveyed to a companion reader when the transponder is suitably activated by the reader. Additional technical details are provided in ISO Standard 11785, which is incorporated into this disclosure by reference.

Radio frequency identification (RFID) systems that communicate with ISO 11785 transponders typically are low frequency reader devices that generate a tag activation signal, and in response, receive an identification data signal transmitted from the RFID tag. Such a reader can use separate transmit and receive antenna elements to perform these functions. However, readers in which a single antenna performs both transmit and receive functions are very economical and efficient, and are frequently utilized in low-frequency RFID readers.

For both types of passive tags specified in ISO 11785, activation energy is transferred to the tag from the reader, and identification code information is transferred to the reader from the tag through mutual coupling via a magnetic field. The FDX-B tag amplitude modulates the reader's activation signal with its binary identification code sequence. Amplitude modulation imposes variations on the activation signal's magnitude, as illustrated by waveform [104d], and the reader is equipped with sensing circuitry capable of detecting these magnitude variations. These magnitude variations have a specific pattern associated with the tag's embedded binary sequence of ones and zeroes. The reader detects this modulation and derives from it the FDX-B tag's identification code. The term "full-duplex" is indicative that the FDX-B tag sends its identification code information during the time when it is receiving the activation signal from the reader.

In contrast, the HDX tag uses the reader's activation signal to charge an internal capacitor (which functions as a very small rechargeable battery), and the tag uses this stored energy to power a transmitter. Once the activation signal ceases, the HDX transponder emits a very small strength internally generated radio signal, utilizing a frequency shift keyed ("FSK") modulation scheme. Specifically, the binary identification code information contained in the HDX tag is serially output such that the occurrence of a binary "1" results in the HDX tag's radio signal being 124.2 KHz and a binary "0" results in the tag's radio signal being 134.2 KHz. The reader detects this FSK signal and derives from it the HDX tag's identification code. The term "half-duplex" is indicative that the reader and the HDX tag exchange the activation signal and the identification code signal in alternating time intervals.

An ISO compliant reader has the capability to activate and detect both FDX-B and HDX type tags. To accomplish this, the ISO compliant reader transmits an activation signal, consisting of a 134.2 kilohertz (KHz) sinusoid, which is switched ON and OFF in a prescribed pattern in accordance with ISO 11785. During the interval in which the 134.2 KHz signal is ON, the FDX-B tag is activated and it transmits its identification code signal cyclically for as long as the activation signal is present. During this ON interval also, an HDX tag charges its internal capacitor. Subsequently, during the interval in which the 134.2 KHz activation signal is OFF, the FDX-B tag is dormant, and the HDX tag transmits its identification code sequence a single time.

Figure 2A:
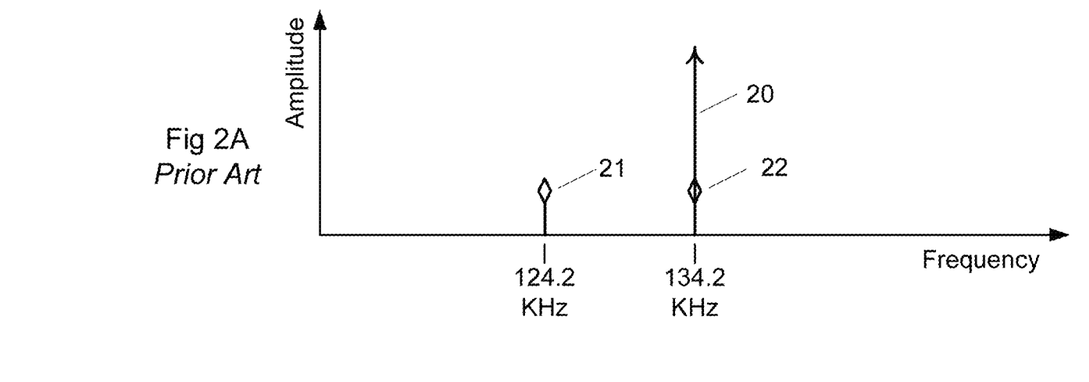
FIGS. 2A and 2B illustrate the frequency spectra of the reader's activation signal and the transponder signal frequencies for ISO HDX and FDX-B transponders, respectively.
Figure 2B:
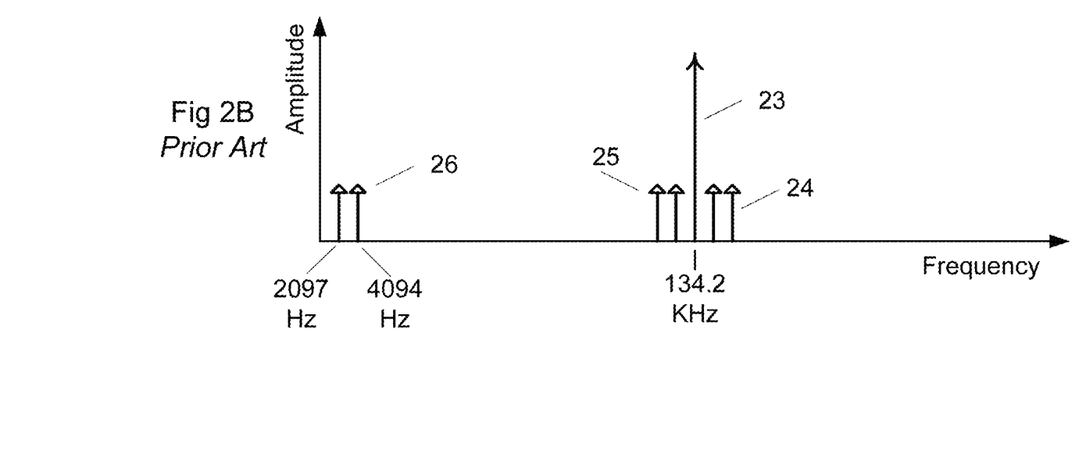

FIGS. 2A and 2B illustrate the frequency spectral characteristics of the RFID system pertaining to ISO 11785 and related to the present invention. FIG. 2A shows the spectra for the HDX case, where the activation signal [20] appears at 134.2 KHz, and where the HDX tag frequencies appear at 124.2 KHz [21] and 134.2 KHz [22]. Since the activation signal and the HDX transponder signals alternate in time, the 134.2 KHz activation signal [20] and the 134.2 KHz transponder signal [22] do not occur simultaneously. Thus, the reader's receive circuitry is able to detect the transponder frequency without being overwhelmed with its own activation signal.

FIG. 2B shows the spectra for the FDX-B case, where the activation signal [23] appears at 134.2 KHz, and where the FDX-B transponder's amplitude modulation appears as sidebands close to 134.2 KHz [24],[25]. As is well known to those of ordinary skill in the art, amplitude modulation sidebands appear symmetrically around the modulated carrier signal, and for FDX-B specifically, these sidebands appear at ±2.097 KHz and ±4.194 KHz. Because the activation signal and the data signal are distinct frequencies, they can occur simultaneously, and the reader is able to separate the two signals, and recover the data contained in these sideband frequencies. When amplitude modulation signals are demodulated, the upper sideband frequencies are translated downward in frequency and appear at 2.097 KHz and 4.194 KHz [26].

RFID systems, such as systems compliant with ISO 11785, are based on radio frequencies (RF), and are susceptible to electromagnetic interference in the same way that radio communications, such as AM and FM broadcast radio and TV, are affected. Radio frequency interference can disrupt the efficacy of RFID systems by reducing the operating range of tags, and in extreme cases rendering the system inoperative. Because HDX and FDX-B tags use different communicating frequencies and modulation techniques, they can be affected differently by a particular interfering signal. Some types of electromagnetic interference is sufficiently broadband as to affect both HDX and FDX-B indiscriminately, while other types of interference will affect one more than the other. For example, HDX tag signals can be affected by activation signals transmitted from other readers operating nearby, by computer screen backlighting circuitry, and/or by switched mode power device radiation in the range of 100 KHz to 150 KHz. Such sources of interference typically will not interfere with FDX-B tags. FDX-B tags, however, can be affected by electrostatic discharge, reader power supply noise, and RF signals containing FDX-B data frequency amplitude modulation. Both HDX and FDX-B are equally disrupted by AC motor variable frequency drive controllers, which tend to radiate wideband amplitude and frequency modulated RF.

Multi-Loop Antennas

Multi-loop antennas with signal cancelling characteristics are known in the art, and are disclosed in U.S. Pat. No. 4,243,980 to Lichtblau (Jan. 6, 1981). Lichtblau discloses an antenna arrangement applicable to an electronic article surveillance (EAS, or anti-pilferage) system in which two multi-loop antennas are used as separate transmit antenna and receive antenna. Lichtblau discloses multi-loop antennas constructed with two loops and with three loops lying in a common plane, in which each loop is twisted 180° with respect to each adjacent loop so as to be in phase opposition. The presence of an anti-pilferage tag induces a change in the coupling between the transmit antenna and the receive antenna such that the tag is always detectable. Lichtblau's multi-loop transmit antenna produces high intensity near field signals that cancel at distances an order of magnitude larger than the antenna height. In a reciprocal manner, Lichtblau's identical multi-loop receive antenna is receptive to signals from the transmit antenna coupled directly and indirectly coupled via the tag, but it cancels interfering signals that originate at distances large compared to the antenna height.

In a later related patent, U.S. Pat. No. 4,751,516 to Lichtblau (Jun. 14, 1988) therein is disclosed a three loop antenna in which the center loop is twisted 180° with respect to each adjacent loop so as to be in phase opposition, and where the specifications for each loop includes its respective dimensions (e.g., area), number of conductor turns, and current. Thus, the same signal cancelling effect obtained with an antenna comprising a center loop whose area equals the sum of the areas of the two adjacent outer loops, having uniform current and number of conductor turns, can also be obtained with an antenna have non-uniform current, unequal number of conductor turns, and unequal areas, as long as the arithmetic product of these three factors (e.g., current×turns×area) remains constant. For example, the area sum of the two outer loops can be hall that of the center loop, if there are twice as many turns or twice the current in the outer loops than the center loop has.

Lichtblau's multi-loop antenna system, however, uses separate transmit and receive antennas in which the transmit antenna emits a swept frequency signal that causes a passive resonant circuit to produce a magnetic field disturbance that the receive antenna is capable of sensing. Lichtblau's objectives are to produce a very high intensity tag activation field close by the antenna that cancels at distances so as not to exceed allowable regulatory limits on transmitting power and so as not to interfere with other nearby EAS systems, and a receive antenna that is insensitive to other EAS systems and distant active electrical noise sources.

Acoustic Noise Interference

A curious and somewhat enigmatic source of interference that affects principally FDX-B type tags is acoustic noise produced by metallic structures located near reader antennas. In some situations, nearby metallic structures resonate due to machinery vibration and shock. Animal movement can also induce acoustic noise resulting from the impact and vibration of metallic structures that comprise gates, corrals, stanchions, traders, and the like. The deteriorative effect that acoustic noise has on RIFD system efficacy has been documented in several field trials and studies.

In 2007, Scotland's Environment and Rural Affairs Department identified acoustic interference as a substantial obstacle to the successful deployment of a radio frequency identification based animal traceability system, and released a tender (*Investigating the Effect of Acoustic/Mechanical Interference on Radio Frequency Identity (RFID) Systems Used to Identify Animals Electronically*—Reference CR/2007/01) that offered research project funding to qualified contractors in return for a technical solution and intellectual property rights.

A research study was conducted at Kansas State University in 2007 on a livestock trailer mounted reading system (Trailer Mounted RFID Reader Scans EID Tags During Cattle Shipments). However, during the study many tags were readable less than half the time, and overall tags were readable less than two-thirds of the time. Such low read rates are generally unacceptable in commercial applications, where read rates in excess of 99% are desirable.

Electromagnetic radiation is typically produced by any electrical or electronic device that uses alternating electrical currents in its operation. Emitted electromagnetic radiation can create interference among electronic devices that share the same spectrum. In some instances, electromagnetic interference can be effectively filtered electronically at the source that creates it or at the device being disrupted by it, using passive or active electronic circuits, by using computational techniques such as digital signal processing, or by using metallic shields that block or redirect the radiation. Electromagnetic interference is especially problematic when the interfering frequencies coincide with the frequencies used by a particular radio frequency system, and separating the desired signal from the interfering signal can be particularly difficult.

SUMMARY OF THE INVENTION

Systems and methods in accordance with embodiments of the invention read RFID transponders and exclude electromagnetic noise related to the vibration of metal objects at acoustic frequencies using multi-loop signal cancelling antennas. Accordingly, an objective of the invention is to use signal cancelling antennas to limit the spatial penetration of the antenna's magnetic field beyond the vicinity occupied by the tag, and minimize the reader's sensitivity to distant magnetic field perturbations, while maintaining sensitivity to the close-by identification tag. In contrast to many prior art multi-loop noise cancelling antennas that utilize separate transmit and receive antennas, noise cancelling antennas in accordance with embodiments of the invention can use a single multi-loop antenna for transmit and receive functions. Furthermore, multi-loop signal cancelling antennas in accordance with embodiments of the invention also transmit a single frequency tag activation signal, sense a multiple bit tag signal containing a unique binary identification sequence, and minimize interfering noise associated with proximal acoustically resonating metallic structures, by limiting the spatial penetration of the antenna's magnetic field and by minimizing the antenna's sensitivity to distant passive magnetic field perturbations. Noise interference from nearby resonating metallic structures is thereby significantly attenuated and/or eliminated through bilateral signal cancellation. In several embodiments, RFID systems also utilize an alternate antenna orientation that optimizes detection of identification tags characterized by random physical orientation.

One embodiment includes a signal cancelling antenna, and an RFID reader circuit configured to drive the signal cancelling antenna with an interrogation signal In addition, the RFID reader circuit and the signal cancelling antenna are configured to detect data modulated onto the interrogation signal, the signal cancelling antenna includes a plurality of loops and at least two of the plurality of loops generate magnetic fields having opposite polarity when driven by the interrogation signal, the plurality of loops are physically arranged so that, when driven by the interrogation signal, the magnetic field proximal to each loop activates any passive RFID transponders present, and the physical arrangement of the plurality of loops causes the magnetic fields generated by the loops, when driven by the interrogation signal, to collectively cancel with increasing distance from the antenna.

In a further embodiment, the magnetic fields generated by each of the plurality of loops when driven by the interrogation signal are sufficient within a distance equal to half the largest dimension of the signal cancelling antenna for a passive RFID transponder to be activated and to modulate data onto the interrogation signal that can be detected by the RFID reader circuit.

In another embodiment, a passive RFID transponder is incapable of being activated and modulating data onto the interrogation signal that can be detected by the RFID reader circuit at points where the magnetic fields generated by the loops of the antenna collectively cancel.

In a still further embodiment, the plurality of loops of the signal cancelling antenna are connected in series.

In still another embodiment, the signal cancelling antenna includes two loops.

In a yet further embodiment, both of the loops have the same height, width, number of windings, and electrical current.

In yet another embodiment, the two loops are connected in series.

In a further embodiment again, the two loops are connected in parallel.

In another embodiment again, the magnetic fields generated by the two loops when the signal cancelling antenna is driven by the interrogation signal have instantaneous opposite polarity.

In a further additional embodiment, the first loop encloses a larger area than the second loop, and the first loop and the second loop generate magnetic fields of equal magnitude having instantaneous opposite polarity.

In another additional embodiment, the second loop includes more windings than the first loop.

In a still yet further embodiment, the second loop carries a larger current than the first loop when the signal cancelling antenna is driven by the interrogation signal.

In still yet another embodiment, the signal cancelling antenna includes three loops.

In a still further embodiment again, the three loops are configured as an inner loop and two adjacent outer loops.

In still another embodiment again, the area enclosed by a first loop is equal to the area enclosed by both the second and third loops.

In a still further additional embodiment, the magnetic field generated by a first loop has instantaneous opposite polarity to the magnetic field generated by a second and third loop, when the signal cancelling antenna is driven by the interrogation signal.

In still another additional embodiment, all loops of the signal cancelling antenna have the same number of windings and carry the same electrical current, when driven by the interrogation signal.

In a yet further embodiment again, the loops of the signal cancelling antenna are connected in series.

In yet another embodiment again, the loops of the signal cancelling antenna are connected in parallel.

In a further additional embodiment again, the plurality of loops are arranged along an axis and the signal cancelling antenna is aligned so that the axis is parallel to the direction in which transponders move past the signal cancelling antenna.

In another additional embodiment again, the plurality of loops are configured so that the overall magnetic field generated by the signal cancelling antenna exhibits three dimensional symmetry.

In another further embodiment, the magnetic fields generated by each of the plurality of loops when driven by the interrogation signal collectively cancel at a distance at least equal to the largest dimension of the antenna.

In still another further embodiment, the magnetic fields generated by each of the plurality of loops when driven by the interrogation signal collectively cancel each other at a distance at least twice the largest dimension of the antenna.

An embodiment of the invention includes positioning an antenna having a plurality of loops so that the vibrating metal structures are located at least a first distance from the antenna, driving an antenna having a plurality of loops to generate magnetic fields having instantaneous opposite polarity that collectively cancel each other beyond the first distance from the antenna, and detecting data modulated onto the interrogation signal by any full-duplex transponders present within the first distance during periods in which the interrogation signal is driving the antenna.

Yet another further embodiment also includes detecting data transmitted by any half-duplex transponders present when the interrogation signal is not driving the antenna.

In another further embodiment again, the plurality of loops of the antenna are aligned along an axis and further comprising locating the antenna so that the axis is parallel to the direction in which transponders move past the signal cancelling antenna.

DETAILED DISCLOSURE OF THE INVENTION

Turning now to the drawings, RFID readers including multi-loop signal cancelling antennas configured to read RFID transponders and exclude electromagnetic noise related to the vibration of metal objects at acoustic frequencies in accordance with embodiments of the invention are illustrated. In many embodiments, the loops of the signal cancelling antenna generate magnetic fields that have instantaneous opposite polarity and effectively cancel when they merge a distance from the antenna. Antennas in accordance with embodiments of the invention are referred to as signal cancelling, as opposed to noise cancelling, because the antennas generate magnetic fields that effectively cancel the interrogation signal (i.e. the signal generated by the antenna) a distance from the antenna that is typically a small multiple of the largest dimension of the antenna. The effect of cancelling the interrogation signal beyond a certain distance from the antenna is to eliminate interference from acoustically vibrating metal structures that could otherwise interfere with data modulated onto the interrogation signal by full-duplex transponders.

In a number of embodiments, the signal cancelling antennas include two loops connected in series, where each loop encloses the same area and incorporates the same number of windings. When discussing antennas in accordance with embodiments of the invention, the term "loop" is used to describe distinct areas enclosed by the antenna and the term "winding" is used to describe each time a conductor is wrapped around the perimeter of an enclosed area. In several embodiments, the signal cancelling antenna includes loops that are aligned along an axis that is aligned parallel to the direction in which transponders move past the antenna. RFID systems and signal cancelling antennas in accordance with embodiments of the invention are discussed further below.

Electromagnetic Interference Associated with Acoustic Noise

Acoustic noise produced by metal structures common in livestock handling environments generally falls into the audible frequency range of 500 Hz to 5000 Hz, which directly overlays the FDX-B data frequencies 2097 Hz and 4194 Hz. An RFID reader antenna is not sensitive to acoustic noise, but it is sensitive to magnetic field perturbations produced by the physical vibrations in the metallic structures that cause the acoustic noise. An RFID reader's antenna typically includes a coil of wire driven by an alternating electrical current, which in turn produces an alternating magnetic field in the immediate vicinity of the antenna. When any metallic object produces acoustic noise within this magnetic field, physical movement of the metal object accompanies the acoustic noise, and the reluctance path of the magnetic field is disturbed. This disturbance manifests as an amplitude modulation of the alternating current frequency driving the antenna. When there is an FDX-B identification tag simultaneously present in the magnetic field, the amplitude modulation of the tag and the amplitude modulation of the metallic object combine, thus distorting the tag's signal and potentially rendering it unreadable.

In many situations involving radio frequency communications, a solution to overcoming the presence of an interfering noise signal is to increase the transmitting power of the communications system, thereby improving the signal to noise ratio. Increasing the strength of the RIFD reader's transmitted magnetic field as a means to overcome the interference correlated with acoustic noise interestingly yields no performance improvement, and in fact aggravates and escalates the problem due to the fact that the interrogation signal is indirectly the source of the noise. Maximizing an RFID reader's emitted magnetic field and receiver sensitivity optimizes coupling with the identification tag, but at the same time increases interference from vibrating metallic structures. A stronger and more penetrating magnetic field couples more effectively with metallic structures, thus increasing the likelihood of interference, rather than improving the system's signal to noise ratio.

Vibrating Metal Structures and Conventional Antennas

Figure 3A:
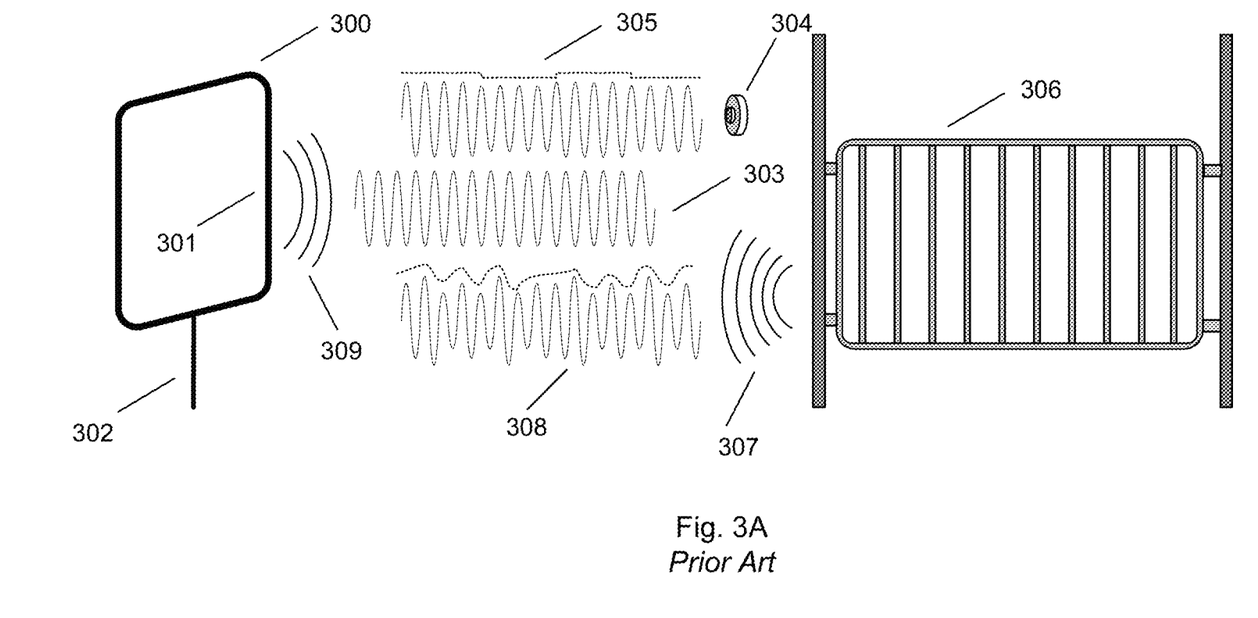
FIG. 3A illustrates the phenomenon of acoustic noise interference on a prior art single loop antenna.

FIG. 3A illustrates a conventional RFID system loop antenna [300], including one or more turns of a conductor [301], and driven by an alternating current signal at the two ends of the conductor [302]. The antenna [300] produces a time varying magnetic field [309] having a constant amplitude sinusoid [303]. An identification tag located close-by the antenna [300] is activated by the magnetic field signal [303], and induces an amplitude modulation, as shown by the signal waveform [305], where the dotted line emphasizes the envelope shape of the waveform [305], and is representative of the tag's binary identification data.

The metallic structure [306] typifies, but is not limited to, a nearby gate, corral, or stanchion metallic structure, commonly found in animal handling environments, and which falls within magnetic field signal's [309], [303] spatial penetration. When static, such a metallic structure [306] can produce steady state magnetic field distortions, possibly leading to detuning of the antenna, power loss, and/or magnetic field warping. However, physical movement of the metallic structure induces time varying changes in the reluctance path of the magnetic field [307], thus inducing amplitude variations on the magnetic field signal [303], exemplified by the illustrated signal waveform [308], where the dotted line emphasizes the envelope shape of the amplitude fluctuations. When these physical movements are correlated with acoustic frequency noise, the waveforms of the signal [308] reflected by the metallic structure and the identification tag modulation [305] are spectrally inseparable. The signal reflected from the vibrating metal structure [308] corrupts the integrity of tag signal [305], and disrupts the reader's detection of the tag signal, thus interfering with the identification system's efficacy.

Multi-Loop Signal Cancelling Antennas

A loop antenna's magnetic field strength, expressed in units of amperes per meter (A/m), is calculated from the equation:

$$H = [u_o N I A]/d^3 \quad (1)$$

where N is the number of conductor turns, I is the current (Amperes) in the conductor, A is the surface area (square meters) of the loop, d is the distance (meters) at which the magnetic field strength calculation is made, and $u_o$ is the permeability constant of free space ($4\pi \times 10^{-7}$ Henry/meter).

As indicated by Equation 1, electromagnetic waves attenuate in relationship to the inverse cube of distance within the near field. Consequently, for a magnetic field strength $H_0$ that exists at 1 meter away from the antenna, the magnetic field strength attenuates at a distance 10 meters away from the antenna to $1/10^3 = H_0/1000$, or about 0.1% of its magnitude at 1 meter.

In order to separate the desired identification tag signal from the unwanted acoustic related interference signal that occupies the same frequency spectrum, RFID readers in accordance with embodiments of the invention use a multi-loop antenna including two or more loops, whose conductors can be electrically connected in series. The antenna is constructed such that the loops generate magnetic fields having opposite magnetic polarities, but equal magnetic field magnitudes when merged, such that beyond a nearby point, the fields effectively cancel. The antenna is a passive electrical component possessing the property of reciprocity, which means that signals originating from beyond this nearby point are canceled or significantly attenuated by the antenna. Signals close-by the antenna, typically within a distance of about one-half the antenna's largest dimension, however, do not cancel. Within this boundary, the signals transmitted from the antenna do not cancel, and signals received by the antenna do not cancel. Consequently, the multi-loop antenna can be designed such that close-by RFID tags are readable, while interference signals resulting from vibrating metallic structures nearby are cancelled.

Two Loop Signal Cancelling Antenna Designs

Figure 4A:
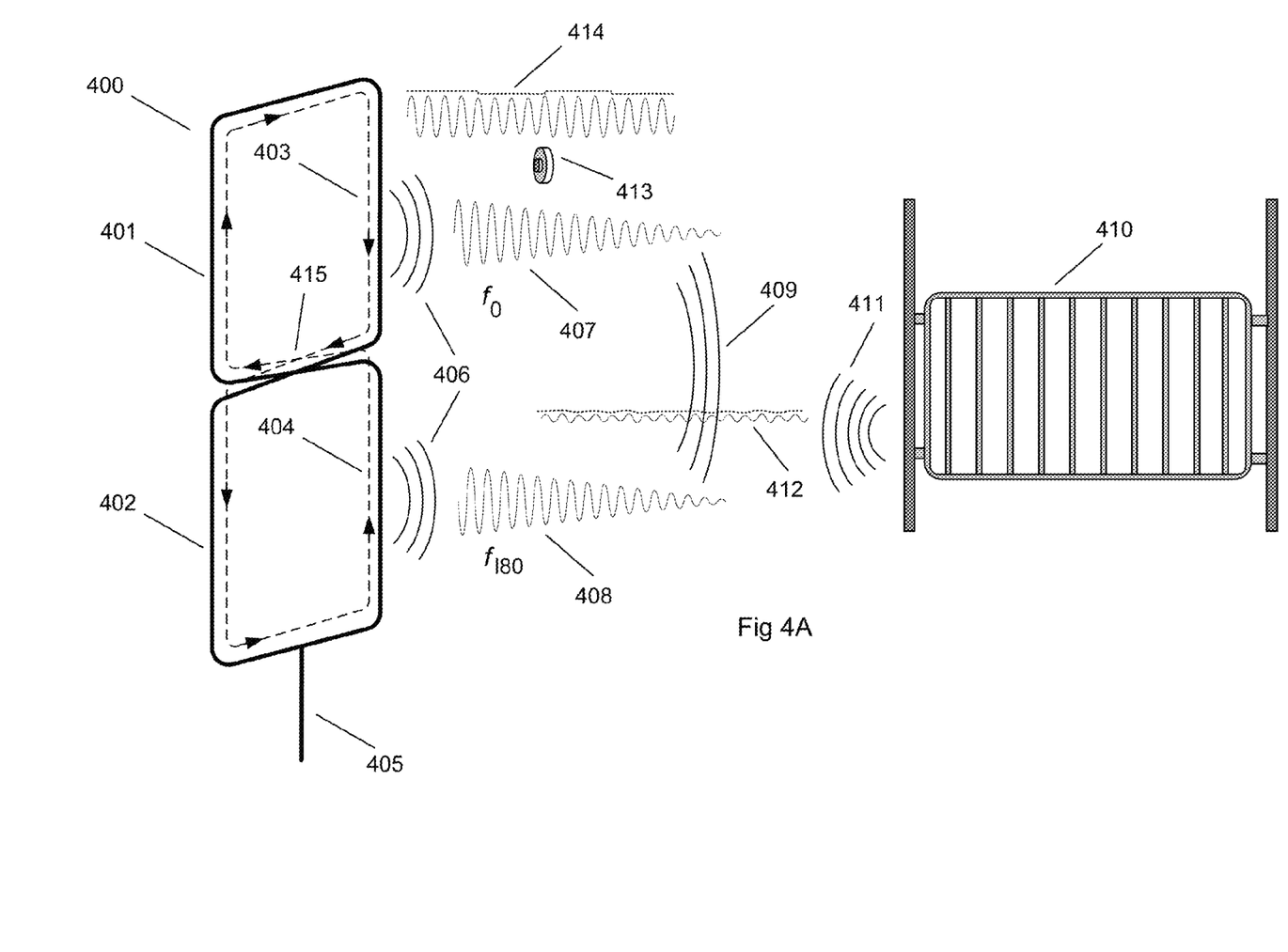
FIG. 4A illustrates the phenomenon of acoustic noise interference on a multi-loop signal cancelling antenna having two loops of opposite polarities in accordance with an embodiment of the invention.

FIG. 4A illustrates a two loop signal cancelling antenna. The antenna [400] includes two loops [401] and [402], both loops having the same height and width dimensions, and both loops containing the same number of windings of conducting wire, and carrying the same magnitude of alternating current (AC).

The two loop antenna is constructed using an electrical conductor that originates and terminates at the bottom of lower loop [402] as indicated by the line [405]. Inasmuch as the present invention relates to an "electrically small" antenna (e.g., an antenna having physical dimensions at least an order of magnitude smaller than the wavelength of its operating frequency), the conductor's point of origin and termination is not critical and can be located anywhere around the antenna's perimeter. From the point of origin, the conductor is wound in a pattern indicated by dashed line [403], [404] such that there is a crossover winding at point [415]. At the completion of N turns, the conductor terminates at the point of winding origin [405], thus ensuring both loops have the same number of complete winding turns. The arrow directions associated with the dashed line [403], [404] show that the winding direction in the upper loop [401] is opposite that of the lower loop [402] by virtue of the winding pattern crossover at point [415].

The dashed line [403], [404] is indicative not only of the conductor winding pattern, but also of the direction in which the alternating current instantaneously flows. While the direction of current is uniform throughout the conductor, as a result of the crossover [415] in the winding pattern that reverses the winding direction, the relative direction of current between the two loops reverses also. As shown, current flows clockwise in the upper loop [403] and counter-clockwise in the lower loop [404]. It is not critical to the present description of operation in which direction either loop is wound, clockwise or counter-clockwise; simply that the winding directions in the upper loop [401] and the lower loop [402] are opposite one another, and thus also have opposite current directions.

According to Ampere's Law, which is commonly expressed in the form $$\oint B \cdot dl = \mu_o i \quad (2)$$

a conductor carrying an electrical current produces a magnetic field whose lines of force can be visualized as concentric circles surrounding the conductor, the direction of the lines of force being a function of the direction of the current. Since the current in the upper loop [401] has the opposite direction [403] of the current [404] in the lower loop [402], the magnetic field produced by the upper loop [401] has the instantaneous opposite polarity of that produced by the lower loop [402].

When the current [403], [404] in the two loop antenna [400] is a sinusoidal alternating current, the current in each loop is periodically reversing, but the currents in the two loops are in opposite phase, and so always have instantaneously opposite directions. Consequently, the magnetic fields [406] produced by the upper loop [401] and lower loop [402] are instantaneously opposite, as depicted by the sinusoidal waveforms $f_0$ [407] and $f_{180}$ [408].

As the magnetic fields [406] produced by the upper loop [401] and lower loop merge together [409] with increasing distance away from the antenna, the magnetic field strength decreases rapidly because the opposite polarities cause the magnetic fields to cancel. As depicted by the waveforms [407], [408], the magnetic field amplitudes attenuate such that the spatial penetration of the composite magnetic field is limited typically to only a few multiples of the antenna's largest physical dimension. With the magnetic field thus greatly attenuated, a nearby metallic structure [410] that produces acoustic noise and associated magnetic field perturbations has a substantially reduced effect on the reluctance of the magnetic field, depicted by waveform [412], as compared with the single loop antenna example [308] illustrated in FIG. 3A.

The two loop antenna possesses the property of reciprocity. An alternating current in the antenna [400] produces two opposing phase magnetic fields [407], [408] that cancel as the two fields merge [409]. Due to reciprocity, an electromagnetic signal [412] originating at or beyond this boundary [409] imposes equally on both loops, and induces equal currents in the upper loop [401] and the lower loop [402]. Because the direction of the conductor winding in the upper loop [403] and the lower loop [404] are opposite each other, the currents induced by the signal [412] are also opposite, thus inducing no net signal current in the composite antenna [400]. Consequently, the signal [412] is effectively canceled by the two loop antenna. The single antenna [400] comprising two anti-phased loops [401], [402] can reduce acoustic noise interference through the combined actions of (a) reduced spatial penetration of the magnetic field, and (b) canceled magnetic field perturbations produced by nearby resonating metallic structures.

At a closer distance, reciprocity holds true also. The identification tag [413] located close-by the antenna induces a larger current in the loop it is closest to, thus the currents induced in the two loops do not fully cancel. The resulting signal differential can be amplified by the RFID reader circuitry and the tag [413] is readable. However, along the axis of the crossover point [415] the currents induced into the two loops are equal and thus cancel, rendering the tag not readable.

Figures 4B, 5B, 6A:
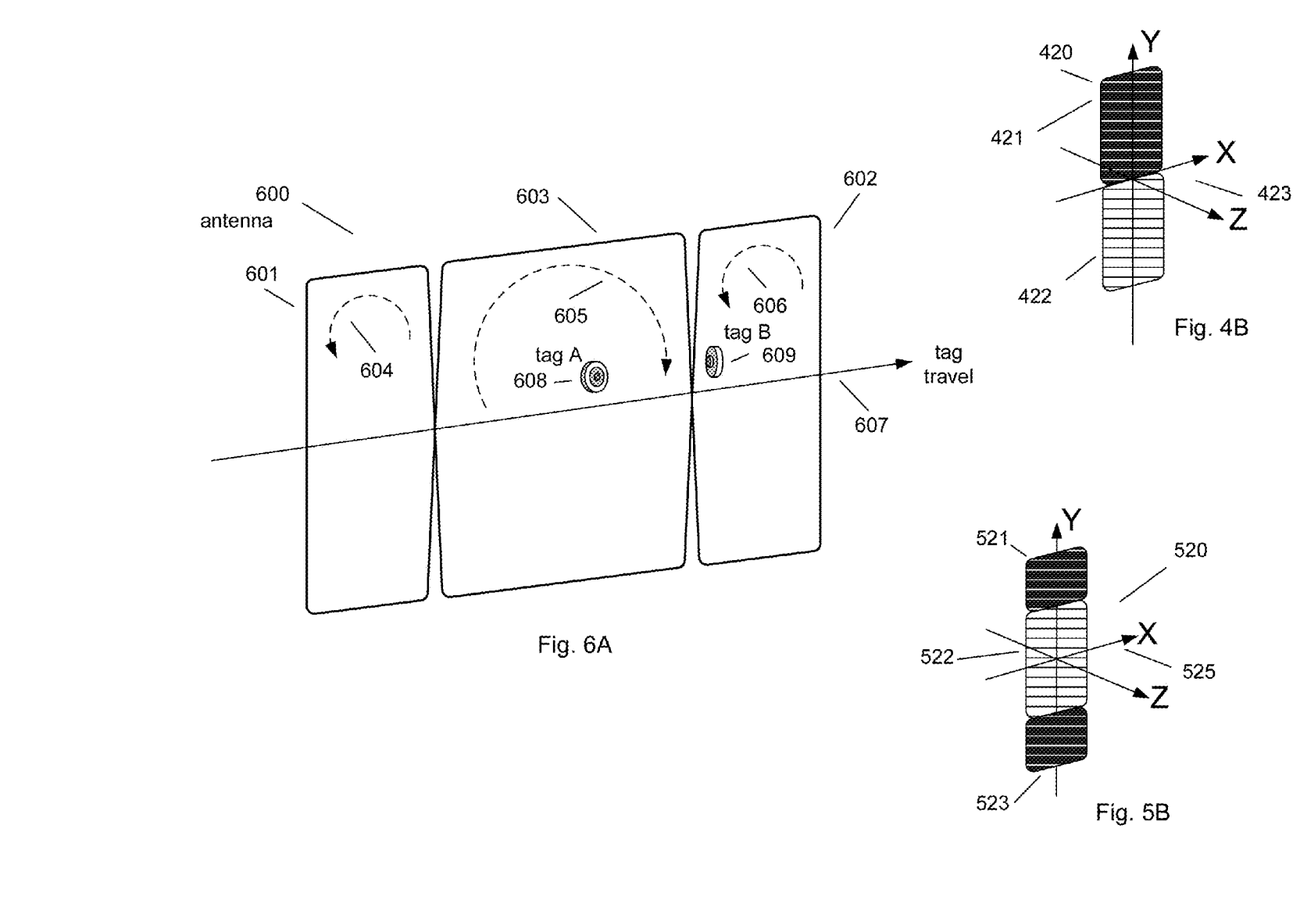
FIG. 4B illustrates the magnetic field asymmetry of the two loop antenna design illustrated in FIG. 4A.
FIG. 5B illustrates the magnetic field symmetry of the three loop antenna design illustrated in FIG. 5A.
FIG. 6A illustrates a three loop multi-loop antenna utilized in the transmit and receive functions of an RFID system in accordance with an embodiment of the invention, and that is oriented for optimal detection of randomly oriented identification tags.

The two loop embodiment of the present invention works effectively in several instances where the vibrating metal structure is located at a distance at least several multiples greater than the antenna's largest dimension, but its performance is less effective when the metallic structure is closer to the antenna, which frequently can be the case. FIG. 4B illustrates the two loop antenna [420] positioned at the origin of a 3-dimensional XYZ axis [423], with the magnetic polarities of the two loops [421], [422] designated by the opposite color shading. The two loop antenna possesses symmetry in the X and Z dimensions, but not in the Y dimension. That is, at any point $z_0$ on the Z-axis, the antenna appears physically and magnetically identical at point $-z_0$. This is also true along the X axis. However, at point $y_0$ on the Y axis, the antenna appears magnetically different than at point $-y_0$, due to the opposite polarity of the upper loop [421] and the lower loop [422]. This lack of symmetry limits the two loop antenna's efficacy in cancelling noise signals at distances in situations where the metallic structure location is biased to one side of the antenna along the Y-axis.

Figure 5A:
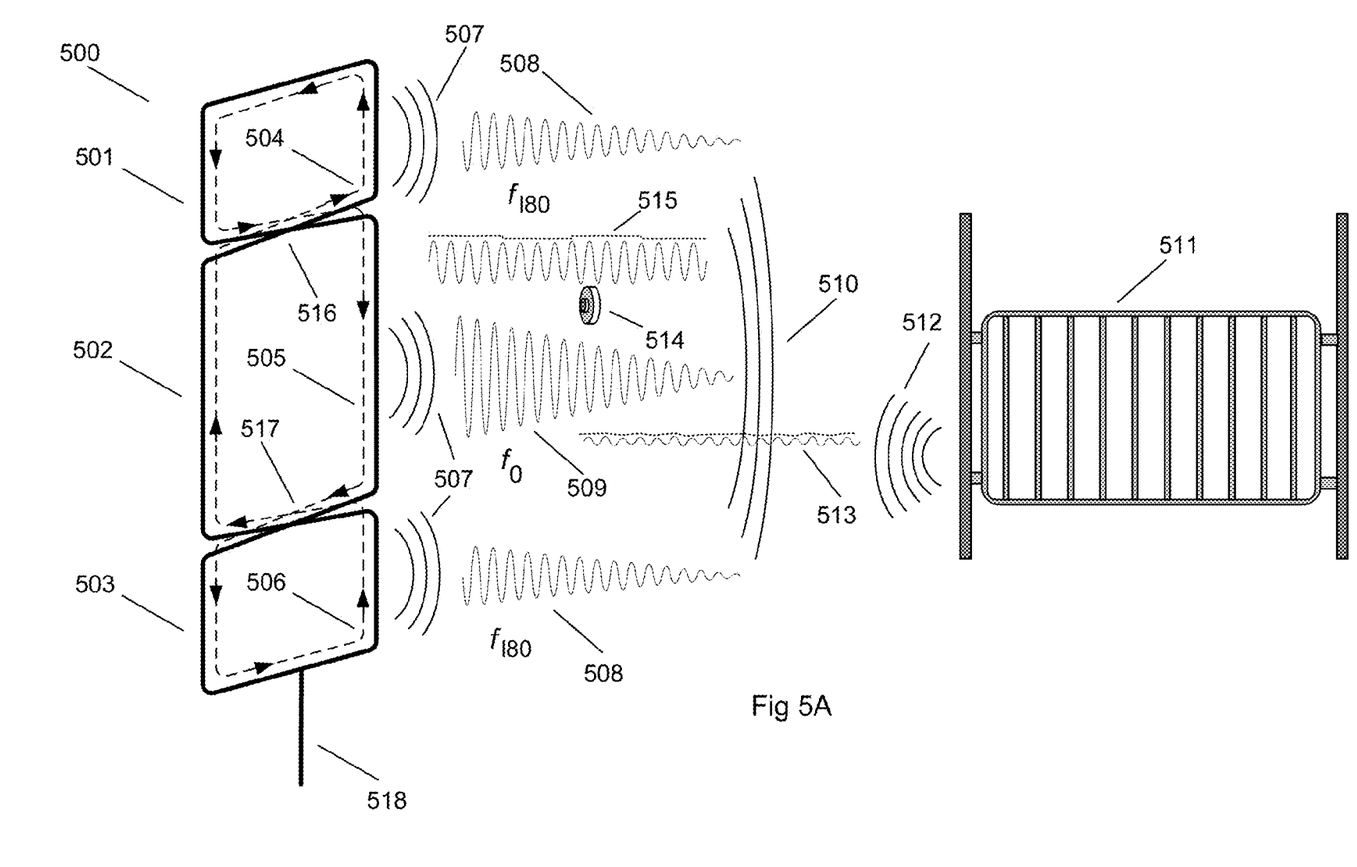
FIG. 5A illustrates the phenomenon of acoustic noise interference on a multi-loop signal cancelling antenna having three loops in accordance with an embodiment of the invention.

Y axis symmetry can be achieved in the multi-loop antenna by splitting one of the loops of the two-loop design in half, and placing the two split loops on either side of the other loop. This design is shown in FIGS. 5A and 5B. In FIG. 5B, the antenna [520] now appears symmetrical in 3-dimensional space [525]. At any point $x_0$, $y_0$, or $z_0$, on the X, Y, or Z axes, respectively, the antenna appears physically and magnetically identical at points $-x_0$, $-y_0$, or $-z_0$, respectively.

Although the embodiment illustrated in FIG. 4A includes an antenna where the number of conductor turns, currents, and surface areas in each loop are equal, a multi-loop antenna in accordance with embodiments of the invention can be constructed where the individual loops have unequal numbers of conductor turns, currents, and/or surface areas, while having equal magnetic field magnitudes. Various multi-loop signal cancelling antenna designs in accordance with embodiments of the invention are discussed below.

Three Loop Signal Cancelling Antennas

FIG. 5A illustrates a three loop signal cancelling antenna in accordance with an embodiment of the invention. The antenna [500] includes two outer loops [501] and [503], each having half the height and the same width as a center loop [502]. All three loops are aligned along a common axis, contain the same number of turns of conducting wire, and carry the same amount of alternating current (AC).

The three loop antenna [500] is constructed using a single conductor that, like the two-loop design, arbitrarily originates and terminates at the bottom of the lower loop [503] as indicated by the line [518]. From this point of origin [518], the conductor is wound in a pattern indicated by dashed line [504], [505], [506] such that there are winding crossovers at points [516], [517]. At the completion of N turns, the conductor terminates at point [518] where the conductor winding originates. The arrow directions associated with the dashed line [504], [505], [506], show that the winding directions in the upper loop [501] and the lower loop [503] is opposite that of the center loop [502] by virtue of the winding pattern crossovers at points [516], [517].

The dashed line [504], [505], [506] is indicative not only of the conductor winding pattern, but of the direction in which the antenna's alternating current instantaneously flows. While the direction of current is uniform throughout the conductor, due to the crossovers [516], [517] in the winding pattern that reverse the direction of the windings, the relative direction of current in the three loops reverses also. It is not relevant to the present description of operation if the upper loop [501] and lower loop [503] are wound clockwise or counter-clockwise, but only that the winding directions in the upper loop [501] and the lower loop [503] are identical and opposite to that of the conductor winding direction of the center loop [502], and thus the current flowing in the center loop [505] is instantaneously opposite in direction relative to the current directions in the two outer loops [504], [506].

When the current [504], [505], [506] in the three loop antenna [500] is a sinusoidal alternating current, the current in each loop is periodically reversing, but the currents in the two outer loops [501], [503], are in opposite phase of that in the center loop [502], and so always have instantaneous opposite directions. Together, the outer loops [501], [503] have the same dimensional area as the center loop [502]. Consequently, the magnetic fields [507] produced by the outer loops [501], [503] together have the same magnitude as the magnetic field of the center loop [502], but the outer loops [501], [502] are instantaneously opposite from the center loop [502], as depicted by the sinusoidal waveforms $f_{180}$ [508], and $f_0$ [509].

As was described for the two loop version of the signal cancelling antenna, the same cancellation of the antenna's magnetic field occurs as the fields from the three individual loops merge [510], and due to reciprocity, the same cancellation of signal [513] originating from vibration of metallic structure [511] occurs. Due to the improved 3 dimensional symmetry of the three loop design, however, these cancellation effects occur closer to the antenna, thus providing improved rejection of unwanted interference, and reduced sensitivity to the location of the interference source.

Mounting Multi-Loop Signal Cancelling Antennas

FIG. 6A illustrates a three loop signal cancelling antenna in accordance with an embodiment of the invention used in an application where the antenna [600] is mounted in a stationary manner, and an identification tag [608], [609], translates [607] past it. Improved sensitivity to a randomly oriented identification tag [608], [609] is achieved by rotating the antenna 90° from the orientation shown in FIGS. 5A and 5B, such that the tag passes by all three loops [601], [602], [603], rather than only the center loop [603] as it would if the antenna [600] was oriented as shown in FIGS. 5A and 5B.

As shown by the dashed lines with arrows, the conductor winding directions and current directions [604], [606] in the outer loops [601], [602] are opposite that of the center loop [603] conductor winding direction and current direction [605]. As the tag [608] travels past the antenna [600], the tag is optimally read directly in front of any of the three loops [601], [602], [603] when the tag is oriented as shown by tag A [608], depicting that the surface planes of the antenna loops

[601], [602], [603] and tag A's [608] antenna coil are parallel. At the junction of the first outer loop [601] and the inner loop [603] and the second outer loop [602] and the inner loop [603], the tag [609] is optimally read when its antenna coil plane is orthogonal to the antenna's [600] surface plane, as shown by tag B [609].

Although the present invention has been described in certain specific aspects, variations to the embodiments presented herein are possible without departing from the spirit and scope of the present invention. For example, while the multi-loop antenna is described herein as having an integral number of conductor turns in each loop, it is equally possible to devise conductor winding patterns that result in a fractional, yet equal, number of conductor turns in each loop, and/or as previously described, manipulating the loop dimensions and/or geometric shapes, and loop currents in compensation so as to yield equal magnetic fields of opposite polarity that cancel in the desired manner. Accordingly, other variations in the construction of a multi-loop antenna, including but not limited to the number of loops, the physical arrangement of the loops, the geometric shape and dimensions of the loops, the number of conductor turns comprising the loops, and the electrical currents flowing in the loops that provide the antenna with signal cancelling attributes can be utilized in accordance with embodiments of the invention. Thus, embodiments of the present invention should be considered in all respects as illustrative and not restrictive.

What is claimed is:

1. A radio frequency identification (RFID) system, comprising:
    a signal cancelling antenna;
    an RFID reader circuit configured to drive the signal cancelling antenna with an interrogation signal;
    wherein the RFID reader circuit and the signal cancelling antenna are configured to detect data modulated onto the interrogation signal;
    wherein the signal cancelling antenna includes a plurality of loops and at least two of the plurality of loops generate magnetic fields having opposite polarity when driven by the interrogation signal;
    wherein the magnetic fields generated by the plurality of loops comprise a crossover point where the magnetic fields generated by the plurality of loops are equal and thereby cancel each other;
    wherein the plurality of loops are physically arranged so that, when driven by the interrogation signal, the magnetic field proximal to each loop activates any passive RFID transponders present;
    wherein the antenna is oriented such that any passive RFID transponder is proximal to each of the plurality of loops in the signal cancelling antenna and the RFID reader circuit is configured to read any passive RFID transponders present when the passive RFID transponders are offset from the crossover point;
    wherein a acoustically resonating metallic structure proximal to the signal cancelling antenna produces acoustic noise in an acoustic noise frequency range that cause magnetic field perturbations creating amplitude variations in a portion of the magnetic field signal emitted by the plurality of loops that is reflected by the acoustically resonating metallic structure;
    wherein the acoustically resonating metallic structure is located relative to the signal cancelling antenna such that the created amplitude variations are induced equally to each loop in the plurality of loops;
    wherein the passive RFID transponders are configured to transmit signals on data frequencies falling within the frequency range coincident with the acoustically resonating metallic structure frequency range;
    wherein the created amplitude variations interfere with the signal transmitted by the passive RFID transponders; and
    wherein the signal canceling antenna is configured to reduce electromagnetic noise interference resulting form the acoustically resonating metallic structure due to the physical arrangement of the plurality of loops causing the magnetic fields generated by the loops, when driven by the interrogation signal, to collectively cancel with increasing distance from the antenna.

2. The RFID system of claim 1, wherein the magnetic fields generated by each of the plurality of loops when driven by the interrogation signal are sufficient within a distance equal to half the largest dimension of the signal cancelling antenna for a passive RFID transponder to be activated and to modulate data onto the interrogation signal that can be detected by the RFID reader circuit.

3. The RFID system of claim 1, wherein a passive RFID transponder is incapable of being activated and modulating data onto the interrogation signal that can be detected by the RFID reader circuit at points where the magnetic fields generated by the loops of the antenna collectively cancel.

4. The RFID system of claim 1, wherein the plurality of loops of the signal cancelling antenna are connected in series.

5. The RFID system of claim 1, wherein the signal cancelling antenna includes two loops.

6. The RFID system of claim 5, wherein both of the loops have the same height, width, number of windings, and electrical current.

7. The RFID system of claim 6, wherein the two loops are connected in series.

8. The RFID system of claim 6, wherein the two loops are connected in parallel.

9. The RFID system of claim 5, wherein the magnetic fields generated by the two loops when the signal cancelling antenna is driven by the interrogation signal have instantaneous opposite polarity.

10. The RFID system of claim 5, wherein:
    the first loop encloses a larger area than the second loop; and
    the first loop and the second loop generate magnetic fields of equal magnitude having instantaneous opposite polarity.

11. The RFID system of claim 10, wherein the second loop includes more windings than the first loop.

12. The RFID system of claim 10, wherein the second loop carries a larger current than the first loop when the signal cancelling antenna is driven by the interrogation signal.

13. The RFID system of claim 1, wherein the signal cancelling antenna includes three loops.

14. The RFID system of claim 13, wherein the three loops are configured as an inner loop and two adjacent outer loops.

15. The RFID system of claim 13, wherein the area enclosed by a first loop is equal to the area enclosed by both the second and third loops.

16. The RFID system of claim 13, wherein the magnetic field generated by a first loop has instantaneous opposite polarity to the magnetic field generated by a second and third loop, when the signal cancelling antenna is driven by the interrogation signal.

17. The RFID system of claim 1, wherein all loops of the signal cancelling antenna have the same number of windings and carry the same electrical current, when driven by the interrogation signal.

18. The RFID system of claim 17, wherein the loops of the signal cancelling antenna are connected in series.

19. The RFID system of claim 17, wherein the loops of the signal cancelling antenna are connected in parallel.

20. The RFID system of claim 1, wherein the plurality of loops are arranged along an axis and the signal cancelling antenna is aligned so that the axis is parallel to the direction in which transponders move past the signal cancelling antenna.

21. The RFID system of claim 1, wherein the plurality of loops are configured so that the overall magnetic field generated by the signal cancelling antenna exhibits three dimensional symmetry.

22. The RFID system of claim 1, wherein the magnetic fields generated by each of the plurality of loops when driven by the interrogation signal collectively cancel at a distance at least equal to the largest dimension of the antenna.

23. The RFID system of claim 1, wherein the magnetic fields generated by each of the plurality of loops when driven by the interrogation signal collectively cancel each other at a distance at least twice the largest dimension of the antenna.

24. A method of interrogating a passive transponder in the presence of metal structures vibrating at acoustic frequencies, comprising:
  positioning an antenna having a plurality of loops so that the vibrating metal structures are located at least a first distance from the antenna, where:
    the vibrating metal structure produces acoustic noise in an acoustic noise frequency range causing magnetic field perturbations creating amplitude variations in a portion of a magnetic field signal that is reflected by the vibrating metal structure and the amplitude variations interfere with a signal transmitted by a full-duplex transponder;
    the acoustically resonating metallic structure is located relative to the antenna such that the created amplitude variations are induced equally to each loop in the plurality of loops; and
    where magnetic fields generated by the plurality of loops comprise a crossover point where the magnetic fields generated by the plurality of loops are equal and thereby cancel each other;
  orienting the antenna such that any full-duplex transponders are proximal to each of the plurality of loops in the antenna, where:
    the full-duplex transponders are configured to transmit signals on data frequencies coincident with acoustically resonating metallic structure frequency range; and
  the antenna is oriented such that any passive RFID transponder is proximal to each of the plurality of loops in the antenna and the RFID reader circuit is configured to read any passive RFID transponders present when the passive RFID transponders are offset from the crossover point;
  driving the antenna using and interrogation signal to generate the magnetic fields having instantaneous opposite polarity that collectively cancel each other beyond the first distance from the antenna;
  reducing electromagnetic noise interference resulting from the acoustically resonating metallic structure using the antenna due to the physical arrangement of the plurality of loops causing the magnetic fields generated by the loops, when driven by the interrogation signal, to collectively cancel with increasing distance from the antenna; and
  detecting data modulated onto the interrogation signal by any full-duplex transponders present within the first distance during periods in which the interrogation signal is driving the antenna.

25. The method of claim 24, further comprising detecting data transmitted by any half-duplex transponders present when the interrogation signal is not driving the antenna.

26. The method of claim 25, wherein the plurality of loops of the antenna are aligned along an axis and further comprising locating the antenna so that the axis is parallel to the direction in which transponders move past the signal cancelling antenna.

27. The system of claim 1, where the acoustic noise frequency range is 500 Hz to 5000 Hz.

28. The system of claim 1, wherein data frequencies are 2097 Hz and 4194 Hz.

29. The method of claim 24, where the acoustic noise frequency range is 500 Hz to 5000 Hz.

30. The method of claim 24, wherein data frequencies are 2097 Hz and 4194 Hz.

* * * * *

UNITED STATES PATENT AND TRADEMARK OFFICE
CERTIFICATE OF CORRECTION

| | |
|---|---|
| PATENT NO. | : 8,854,188 B2 |
| APPLICATION NO. | : 12/939099 |
| DATED | : October 7, 2014 |
| INVENTOR(S) | : Robert Stewart |

Page 1 of 1

It is certified that error appears in the above-identified patent and that said Letters Patent is hereby corrected as shown below:

In the Claims

Column 13, line 55 please change "a" to "an".

Signed and Sealed this
Tenth Day of February, 2015

Michelle K. Lee
*Deputy Director of the United States Patent and Trademark Office*